US008596299B2

(12) United States Patent
Patel et al.

(10) Patent No.: US 8,596,299 B2

(45) Date of Patent: Dec. 3, 2013

(54) EXTERNALLY MOUNTED MECHANICAL VALVE SHUTOFF DEVICE WITH TIMER

(75) Inventors: Ajay Patel, Blackwood, NJ (US); Alan Kenyon, Barnegat, NJ (US); Arvind A. Patel, Blackwood, NJ (US)

(73) Assignee: Turtle Industries, LLC, Norristown, PA (US)

( * ) Notice: Subject to any disclaimer, the term of this patent is extended or adjusted under 35 U.S.C. 154(b) by 750 days.

(21) Appl. No.: 12/798,296

(22) Filed: Apr. 1, 2010

(65) Prior Publication Data

US 2010/0252767 A1 Oct. 7, 2010

Related U.S. Application Data

(60) Provisional application No. 61/211,711, filed on Apr. 2, 2009.

(51) Int. Cl.
*F16K 31/44* (2006.01)

(52) U.S. Cl.
USPC ....... 137/624.11; 251/230; 267/154; 267/155

(58) Field of Classification Search
USPC ...................... 137/1, 624.11, 624.21, 624.22; 251/213, 230; 267/154, 155
See application file for complete search history.

(56) References Cited

U.S. PATENT DOCUMENTS

| | | | | |
|---|---|---|---|---|
| 5,927,328 | A * | 7/1999 | Nelson et al. | 137/624.12 |
| 6,755,213 | B1 * | 6/2004 | Lai | 137/624.11 |
| 7,128,191 | B2 * | 10/2006 | Fisher | 267/155 |
| 7,845,369 | B2 * | 12/2010 | Atassi | 137/624.12 |

* cited by examiner

*Primary Examiner* — Kevin Lee

(74) *Attorney, Agent, or Firm* — Gerard F. Dunne

(57) ABSTRACT

An externally mounted mechanical device for mechanically closing a pressurized tank or cylinder valve, such as a grill tank, is provided. The device comprises a securing mechanism, a rotatable mechanism having a handle recess to receive a handle of pressurized tank or cylinder valve, and a torsional spring, wherein the torsional spring is configured to store potential torsional force and then release the torsional force by way of a timed release mechanism. The mechanical device comprises a securing device for securing the mechanical device to a tank or cylinder. Torsional force may be stored in torsional spring by way of a ratchet and pawl that also is configured to release the stored torsional force by way of a timed release.

16 Claims, 21 Drawing Sheets

EXTERNALLY MOUNTED MECHANICAL VALVE SHUTOFF DEVICE WITH TIMER

CROSS-REFERENCE TO RELATED APPLICATION

This application claims the priority and benefit of U.S. Provisional Patent Application Ser. No. 61/211,711, filed Apr. 2, 2009, entitled "Externally Mounted Mechanical Valve Shutoff Device with Timer," the entirety of which is incorporated by reference as if fully set forth herein.

FIELD OF THE INVENTION

The invention relates generally to a mechanical shutoff device for cylinders and tanks and more specifically to externally-mounted mechanical valve shutoff devices for propane tanks, including, but not limited to, grill tanks and tanks for outdoor heaters and other appliances, oxygen tanks, compressed air tanks, and other pressurized tanks and cylinders having a mechanical shutoff handle.

BACKGROUND OF THE INVENTION

Tanks and cylinders are used to contain pressurized gasses for use. As an example, propane tanks provide propane gas through a gas supply system for use. Propone tanks may be used for supplying propane gas through a gas supply system, such as a gas line or hose, to gas grills. Propane tanks are relatively easy to use.

The use of propane gas in gas supply systems has its problems. Propane gas may leak from gas supply systems for any number of reasons such as for example misplaced, improperly installed, or dry-rotted gaskets at connection points in the gas supply system. For example, a gasket at a connection point between the valve on the gas tank and a supply line may leak gas. In addition, the gas line or hose may leak for any number of reasons, such as dry rot, improper manufacture, or leaky seals between the gas line or hose and a male or female connection point. Furthermore, gas may leak from a faulty or aged grill burner. All of these problems may exist with a gas system charged with a propane tank. In certain instances, even a slow leak in a gas supply system will quickly deplete the gas in a propane tank. The result of a leak is wasted gas emitted into the air and even an empty tank. Leaking gas also poses a safety hazard in case the gas were to ignite and the tank may explode.

There may be several remedies for fixing a known leak. For example, faulty gaskets, hoses, valves, grill burners, and connection points may be replaced. Sealants may be used to create better seals at connection points. Additionally, an alternative to fixing a leaky gas system would be to manually close the valve on a propane tank after use.

However, and in many cases, this still provides problems. A user of a propane tank may simply forget to close the valve on a propane tank. Furthermore, a user of a propane tank may not be aware of a leak. Thus, even with taking traditional measures to prevent a gas leak, such leak may still occur.

SUMMARY OF THE INVENTION

There is a present need for an externally-mounted mechanical valve shutoff device for a propane tank. The externally-mounted mechanical valve shutoff device may have a timer for timing when the device will close a valve handle of a tank when the valve is opened.

There is also a present need for an externally-mounted mechanical valve shutoff device that provides a safety mechanism to prevent hazards posed by leaking gas by a timed preset mechanical closing of valves of pressurized tanks and cylinders.

There is also a further present need for an externally-mounted mechanical valve shutoff device that provides an environmentally beneficial mechanism to prevent potentially harmful effects of leakage of gas into the air by a timed preset mechanical closing of valves of pressurized tanks and cylinders.

A mechanical valve shutoff device is provided with an embodiment of the present invention. The device comprises a non-rotational housing which is configured for attachment with a pivotable and telescoping arm to a cylinder or tank. The device also comprises a rotational housing configured to receive a handle of the cylinder or tank. The device comprises further a torsional spring attached to the non-rotational housing and the rotational housing. The torsional spring is capable of storing rotational force and releasing rotational force when triggered to do so by way of the timer device.

The non-rotational housing comprises a securing top with a timer device, a rotatable timer adjustable handle having a driving arm substantially attached to a driving shaft of the timer device, and a spring base assembly attached to the securing top. Furthermore, the mechanical shutoff device is capable of rotating the rotatable timer adjustable handle about a center axis of the device from a substantially wound configuration to a substantially unwound configuration of the timer device.

The spring base assembly comprises a housing to secure a first end of the torsional spring to the spring base assembly and second end of the torsional spring to a slot of a center post of the rotational housing. The spring base assembly comprises a pawl and ratchet wherein the pawl is pivotally secured by a first post to the spring base assembly. The pawl comprises a second post configured to pivot the pawl about the first post and a second post. An extensible spring connect the first post to the second post to bias pawl in a default configuration to engage ratchet.

The pawl and ratchet is configured to releasably maintain torsional force of the torsional spring in a wound position. The second post of the pawl is configured to facilitate release of the torsional force of a wound torsional spring when the driving arm of the rotatable timer adjustable handle is in a substantially unwound configuration.

The rotational housing is configured to be rotatably driven by release of torsional force of torsional spring when the driving arm of the rotatable timer adjustable handle is in the substantially unwound configuration. The rotational housing comprises projections along a raised annular surface configured to be received in an annular slot of the rotatable timer adjustable handle.

Another embodiment of the present invention is provided as a mechanical device for mechanically closing a pressurized tank or cylinder valve. The device comprises a securing mechanism, a rotatable mechanism having a valve handle recess, and an internal torsional spring. The torsional spring is configured for storage and release of torsional force whereby the release of the torsional force is triggered by a timing device. The securing mechanism comprises a securing device for securing the mechanical device to a tank or cylinder.

The securing mechanism comprises a securing arm and a top housing a timer. The top is substantially attached to a spring assembly housing the torsional spring.

The device further comprises a timer handle having a driver arm configured to wind the timer. The timer is configured to rotate the driver arm from a substantially wound configuration to a substantially unwound configuration.

The driver arm is configured to pivot a pawl rotatably attached to the spring assembly and biased with a extensible spring to a default ratchet engagement position.

A ratchet is attached to a center post of the rotatable mechanism. The pawl is configured to releasably secure the ratchet for a preset time period.

The pawl and ratchet are configured to store torsional force with a substantially wound torsion spring.

The ratchet, the center post, and the rotatable mechanism are configured to rotate about a center axis of the device.

Yet a further embodiment of the present invention comprises a method for timed closure of a pressurized tank or cylinder mechanical valve.

The method comprises the step of placing a valve handle of a pressurized cylinder or tank within a recess of the rotatable mechanism, wherein the valve handle is in a position in which the valve of the pressurized cylinder or tank is closed. The method also comprises substantially attaching a securing arm of securing mechanism to the pressurized tank or cylinder.

The method comprises the further step of setting a timer attached to the securing mechanism by rotating a timer adjustable handle attached with an arm to a drive shaft of the timer. The method comprises the further steps of rotatably winding a torsional spring with a rotatable mechanism rotatably attached to a securing mechanism, wherein a first end of the torsional spring is attached to a center post of the rotatable mechanism and a second end of a torsional spring is attached to a spring assembly of the securing mechanism. Then, the method comprises the step of storing torsional force of wound torsional spring with a pawl of a spring assembly engaging a ratchet attached to the center post of rotatable mechanism.

The method comprises the further step of releasing the stored torsional force of the torsional spring to rotate the cylinder or tank handle within a recess of the rotatable mechanism. The torsional force is released when the drive shaft of the timer turns the arm to actuate the pawl away from the ratchet.

The method comprises the further step of closing the pressurized tank or cylinder valve by mechanical rotation of the valve handle of the tank or cylinder to a closed valve position with the rotatable mechanism driven by the released torsional force of the torsional spring.

DESCRIPTION OF EMBODIMENTS OF THE INVENTION

Figure 1:
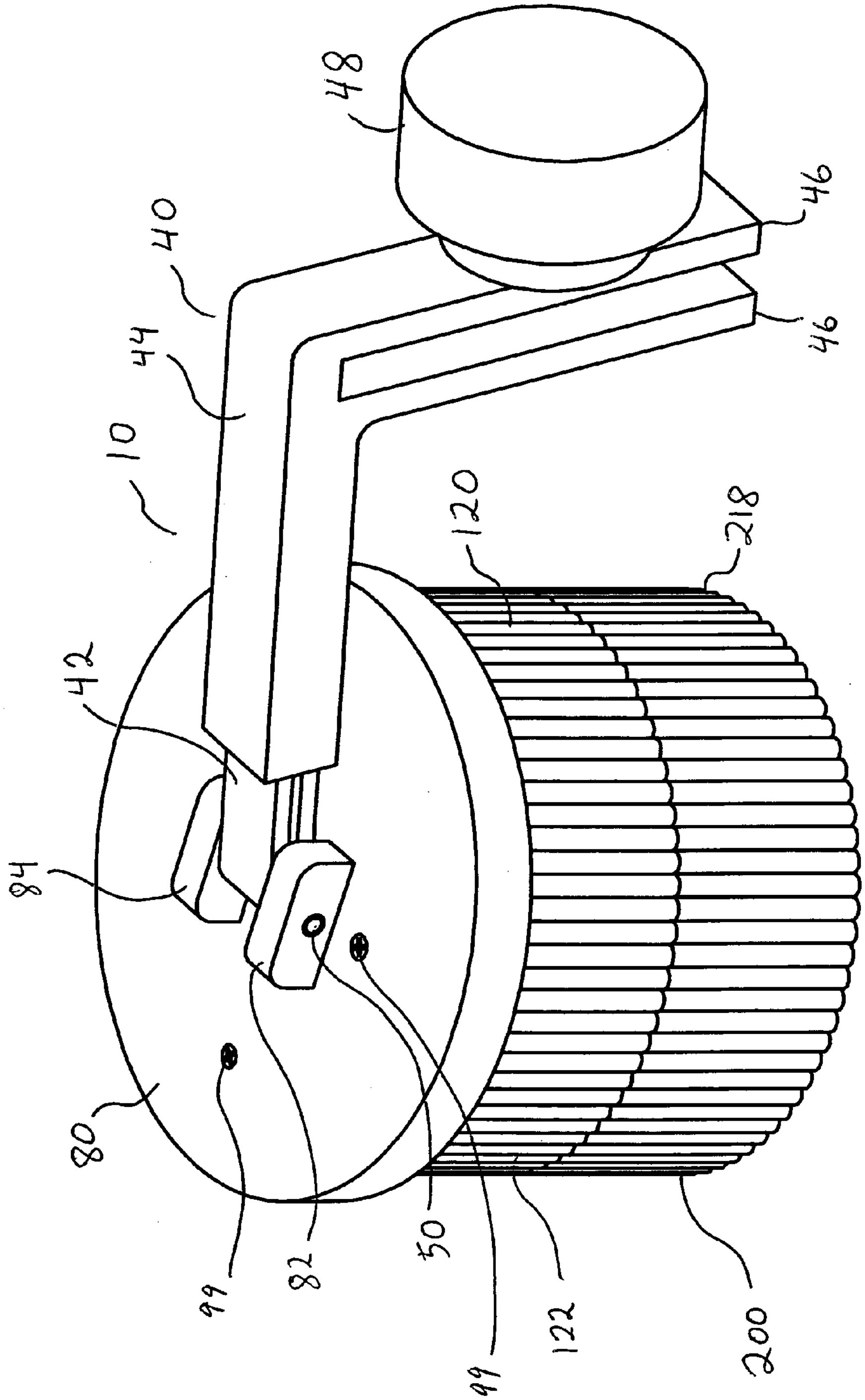
FIG. 1 shows a front perspective view of an externally-mounted mechanical valve shutoff device of the present invention.

In reference to FIGS. 1 through 21, mechanical shutoff device 10 for pressurized cylinders and tanks and specifically to externally-mounted mechanical valve shutoff devices for propane gas tanks, including those for grills, is provided by the present invention.

Referring generally to FIGS. 1 through 21, mechanical shutoff device 10 comprises telescoping securing arm 40 pivotally attached with pin 50 to securing top 80. Mechanical shutoff device 10 also comprises a timer adjustable handle 120 rotatably secured to securing top 80 and spring base assembly 140 attached to the securing top 80. Mechanical shutoff device 10 comprises further valve handle cover 200 rotatably attached, in part, by clock spring 152 to spring base assembly 140.

Figure 19:
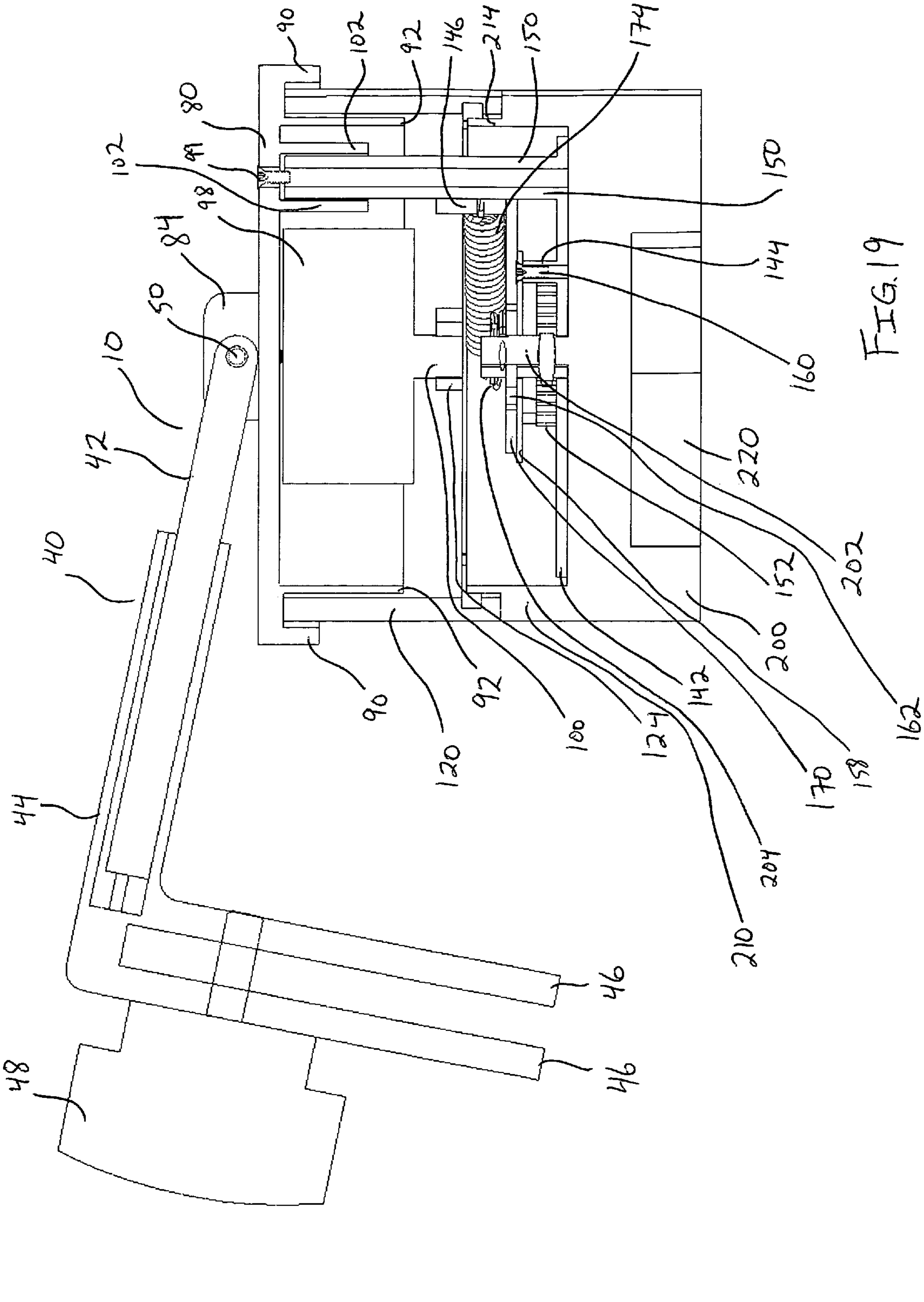
FIG. 19 shows a sectional view of the externally-mounted mechanical valve shutoff device[, taken along Line Y, as identified in FIG. 2]
Figure 20:
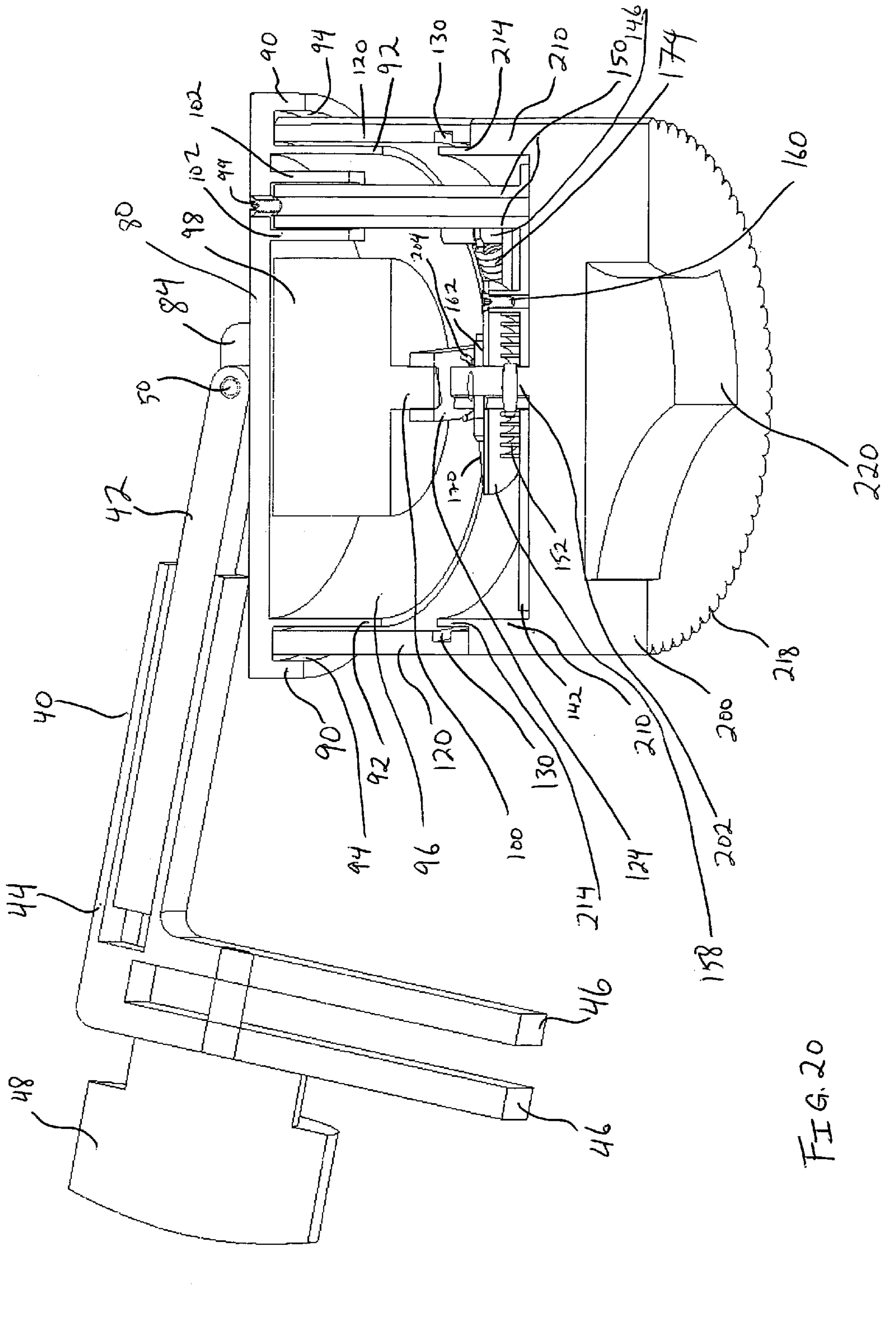
FIG. 20 shows a bottom perspective view of the sectional view shown in FIG. 19.
Figure 21:
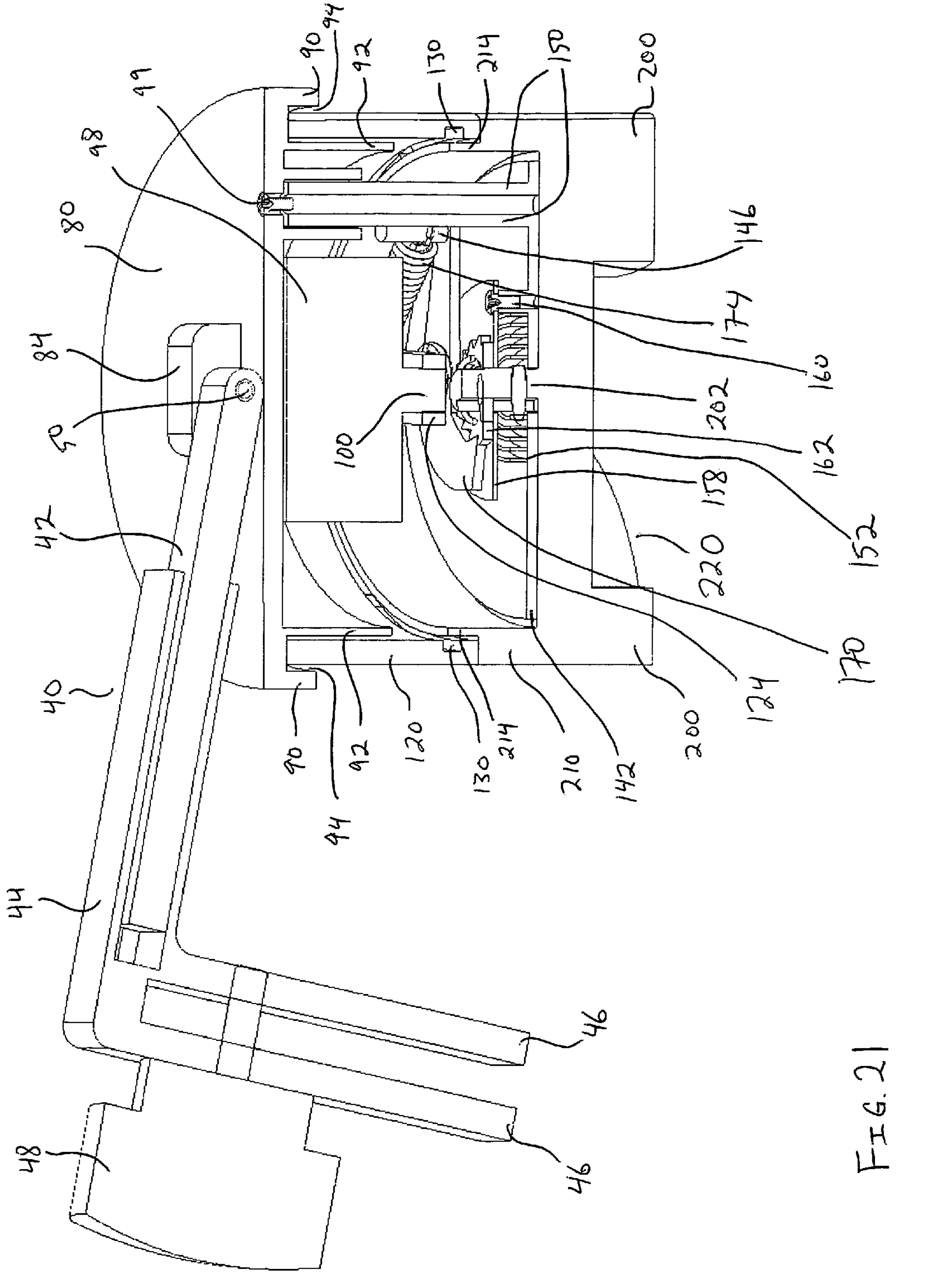
FIG. 21 shows a top perspective vie of the sectional view shown in FIG. 19.

Referring now specifically to FIGS. 1 through 9 and more generally to FIGS. 19 through 21, telescoping securing arm 40 is provided with mechanical shutoff device 10. Telescoping securing arm 40 comprises first portion 42 which is configured to slide within second portion 44 and to increase and decrease the distance between fork-like securement support 46 and mechanical shutoff device 10. As shown in FIGS. 1 through 9, fork-like securement support 46 is configured such that the valve collar of a propane grill tank can slide within fork-like securement supports 46 when positioning mechanical shutoff device 10 on the propane grill tank. Engagement 48 is provided to removeably secure telescoping securing arm 40 to a valve collar of a propane grill tank. Engagement 48 may comprise a thumb screw as shown throughout FIGS. 1 through 9 and FIGS. 19 through 21. Also provided with telescoping securing arm 40 is pin receiving communication 52 configured to receive pin 50 to secure telescoping securing arm 40 pivotally to securing top 80.

Telescoping securing arm 40 may be comprised of plastic, polymers, metal, metal alloys, fiberglass, graphic, or any suitable material capable of securing mechanical shutoff device 10 to a propane tank, or any combination thereof. Telescoping securing arm 40 may also be further adapted to be attached to other forms of pressurized cylinders and tanks.

Referring now to FIGS. 1 through 7 and FIGS. 19 through 21, securing top 80 of mechanical shutoff device 10 comprises various aspects through the several views thereof. Particular, securing top 80 comprises first portion pin receiving mount 82 with first communication 86 and second portion pin receiving mount 84 with second communication 88. Mounts 82, 84 may be provided along the top surface of securing top 80 and are distanced from one another to receive first portion 42 having pin receiving communication 52. Communications 86, 88 are configured to receive and secure pin 50 which is also positioned within pin receiving communication 52 of first portion 42 of telescoping securing arm 40. Pin 50 is configured to allow telescoping securing arm 40 to pivot within Mounts 82, 84.

Figure 6:
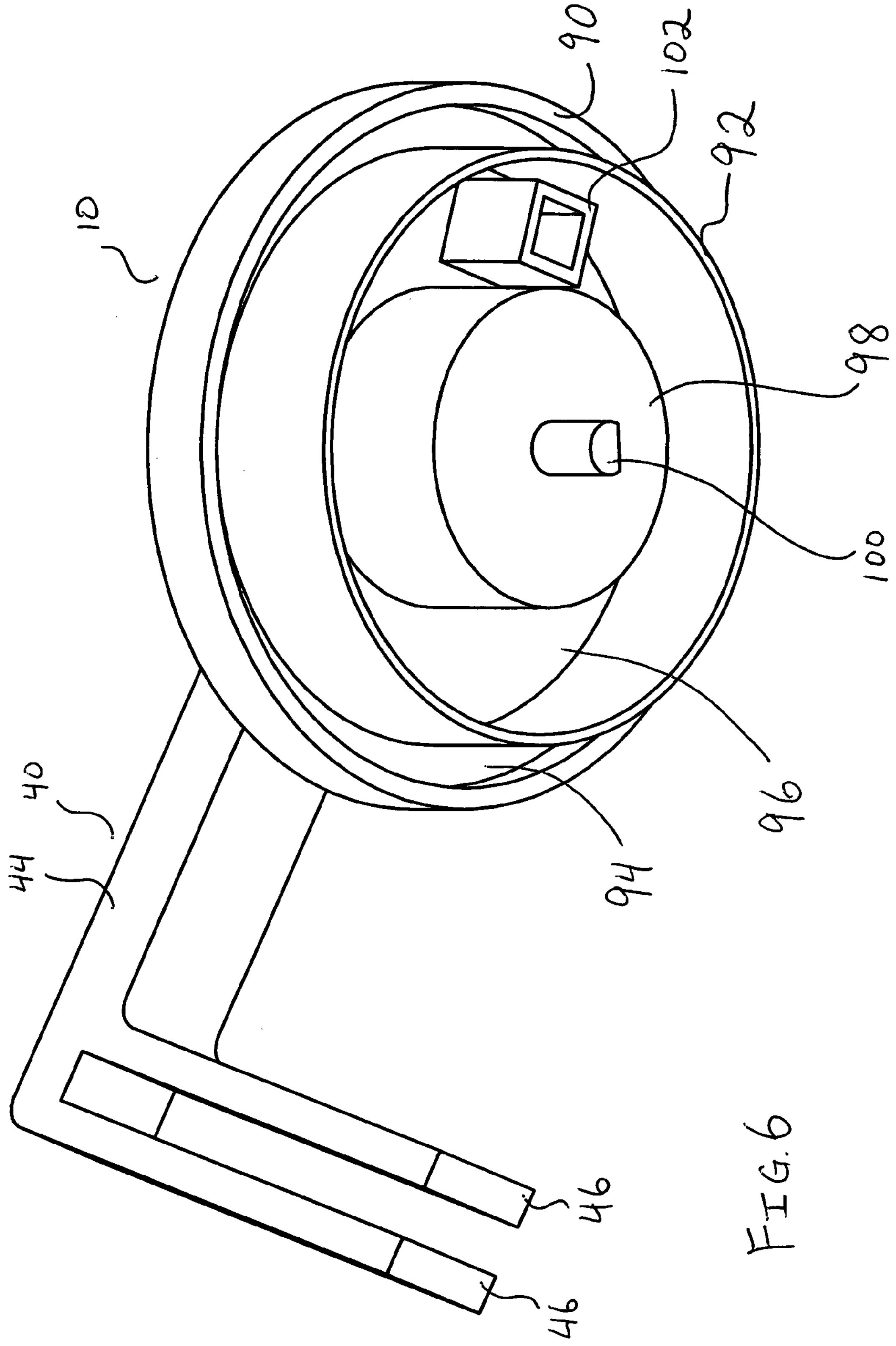
FIG. 6 shows a bottom perspective view of a securing top with telescoping securing arm of an externally-mounted mechanical valve shutoff device.
Figure 7:
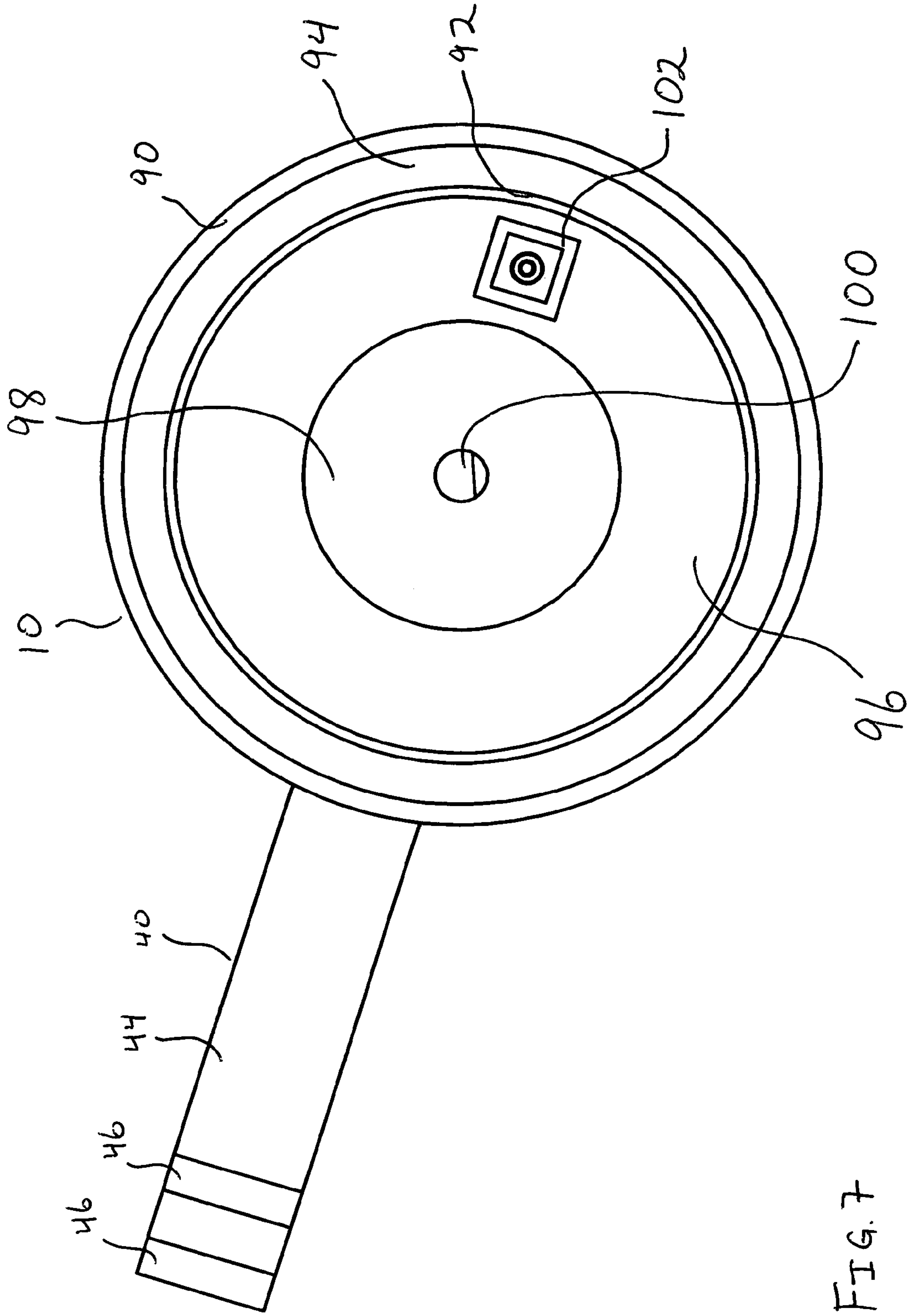
FIG. 7 shows a bottom view of a securing top with telescoping securing arm of an externally-mounted mechanical valve shutoff device.
Figure 8:
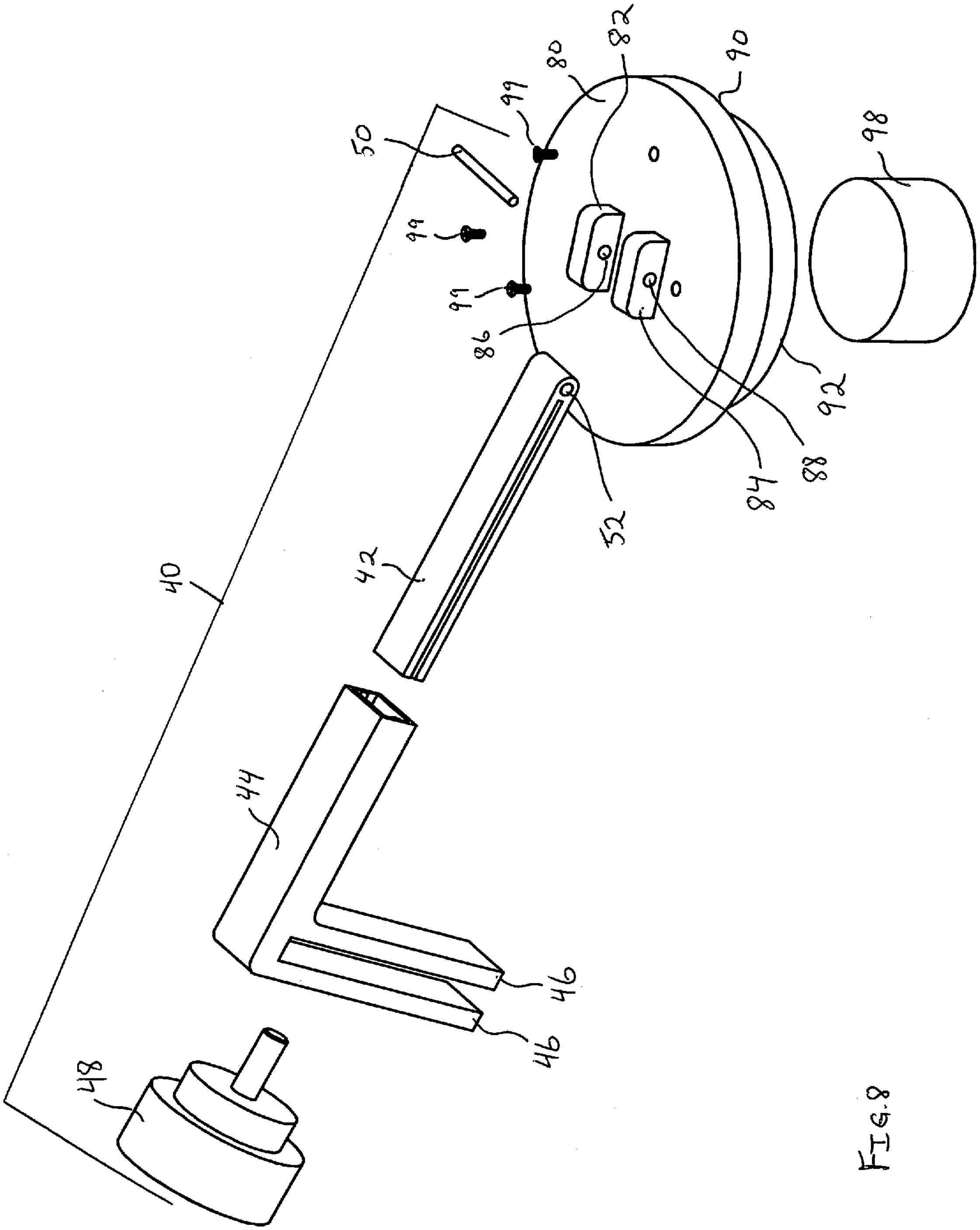
FIG. 8 shows an exploded view of a securing top with telescoping securing arm of an externally-mounted mechanical valve shutoff device.
Figure 9:
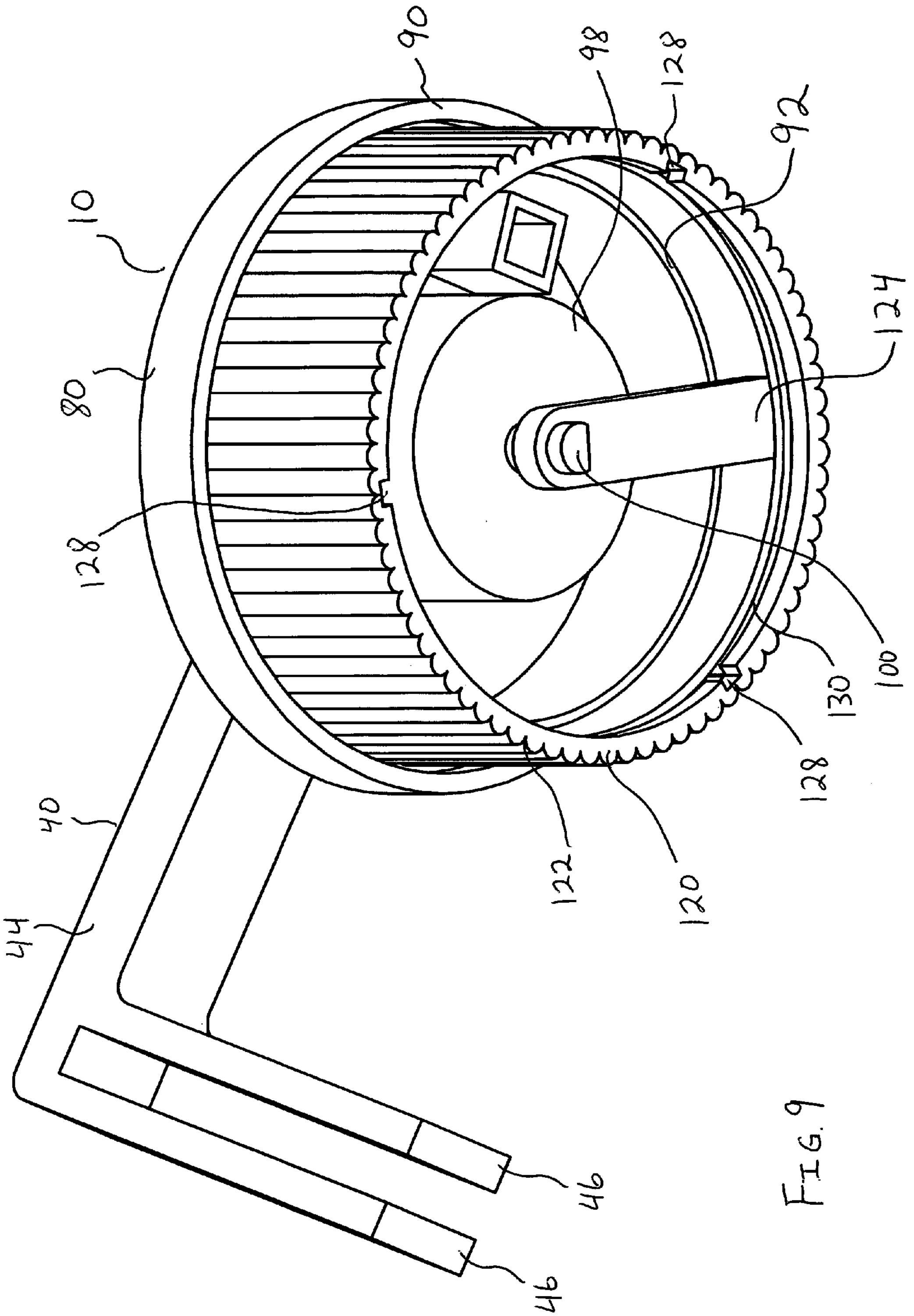
FIG. 9 shows a bottom perspective view of a securing top with a timer adjustable handle of an externally-mounted mechanical valve shutoff device.
Figure 10:
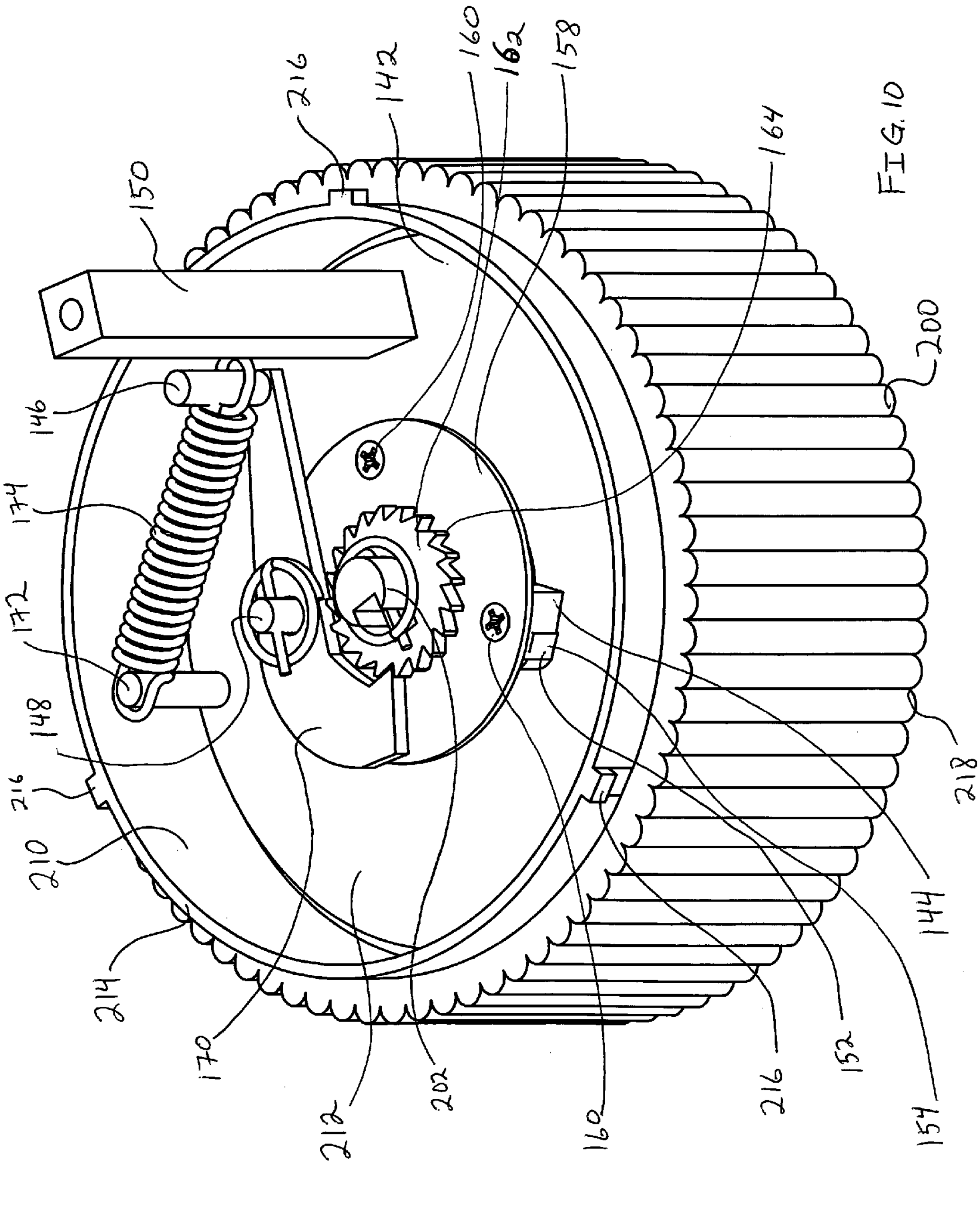
FIG. 10 shows a top perspective view of a spring base assembly and a valve handle cover of an externally-mounted mechanical valve shutoff device.
Figure 11:
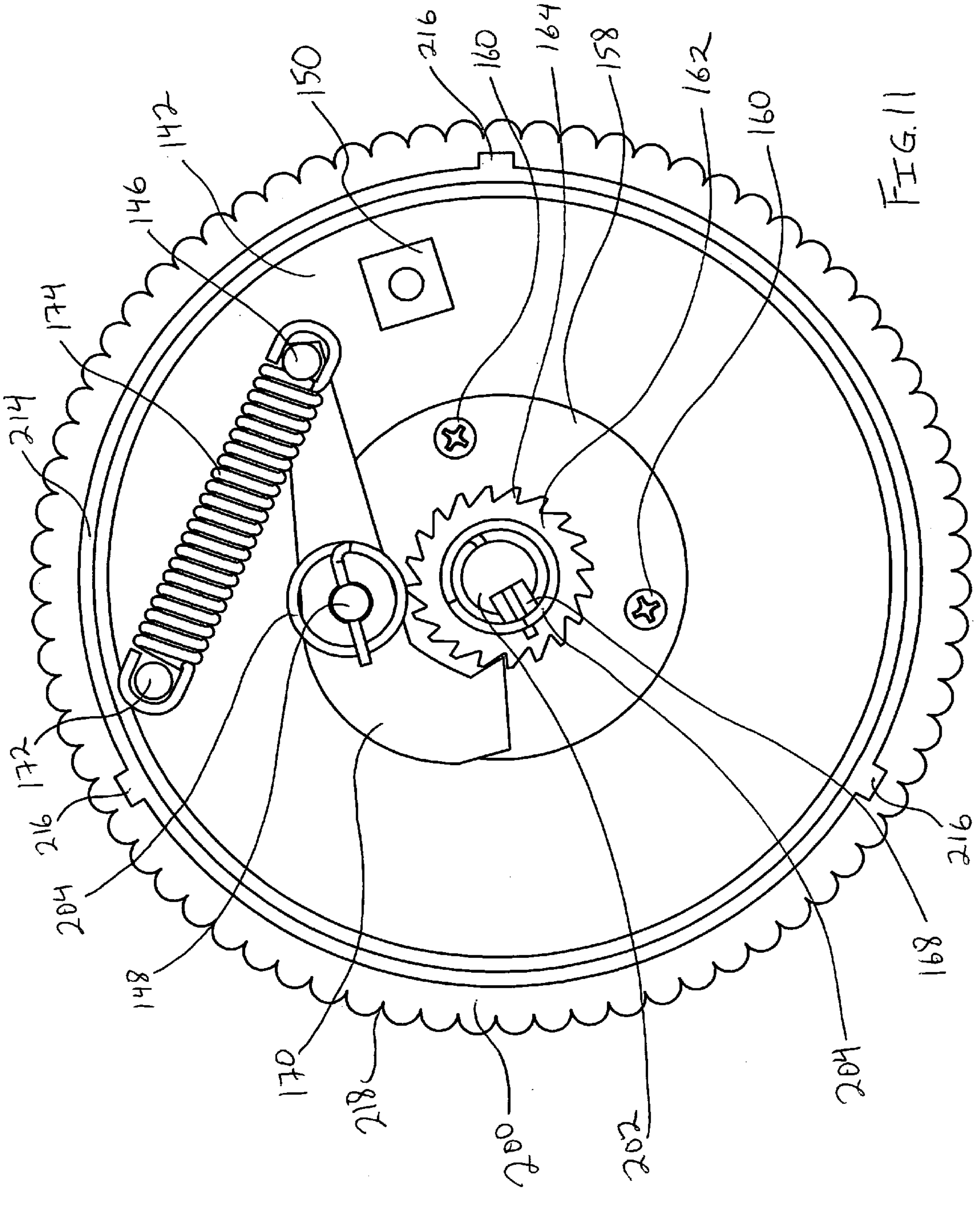
FIG. 11 shows a top view of a spring base assembly and a valve handle cover of an externally-mounted mechanical valve shutoff device.
Figure 12:
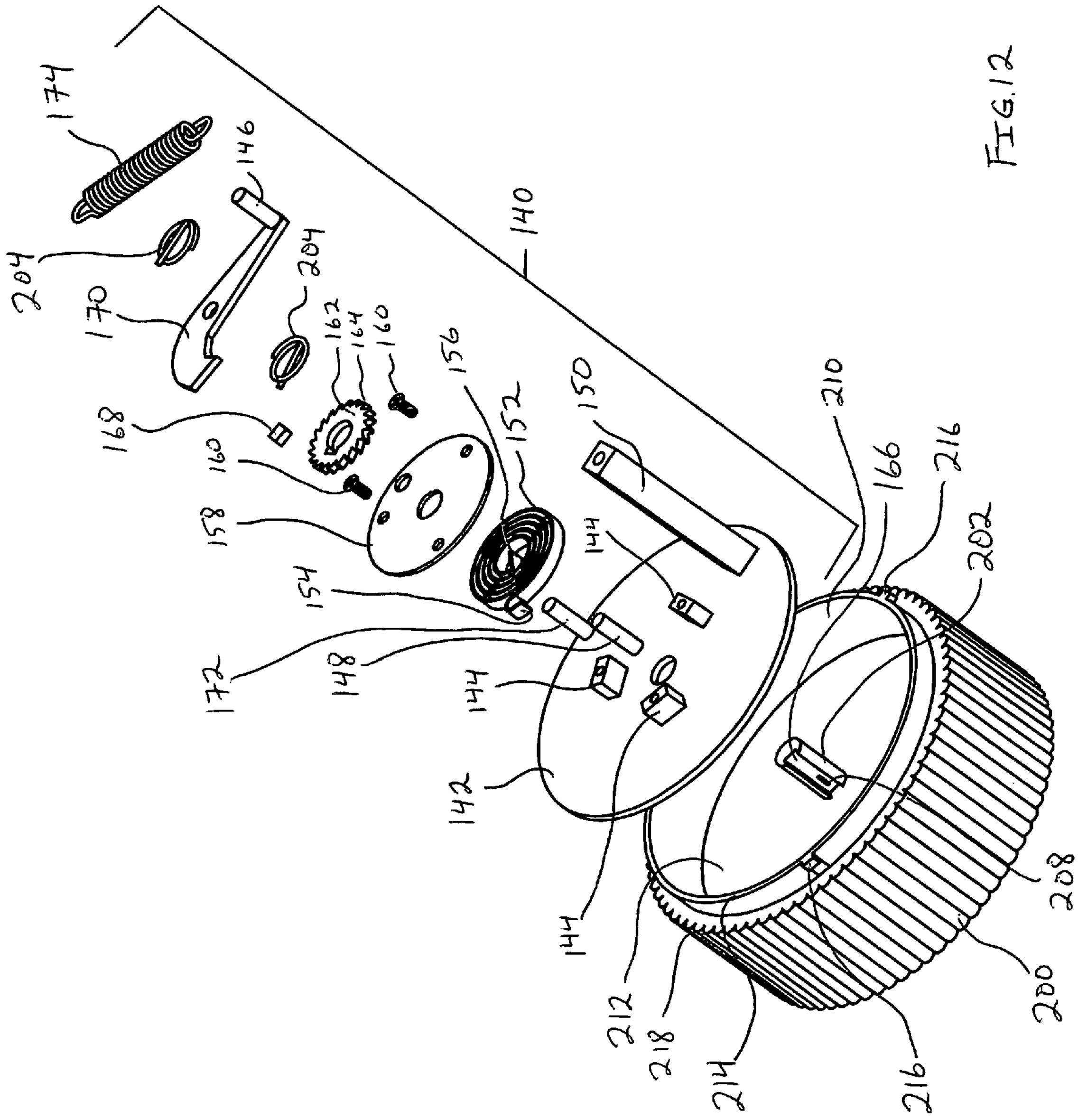
FIG. 12 shows an exploded view of a spring base assembly and a valve handle cover of an externally-mounted mechanical valve shutoff device.
Figure 13:
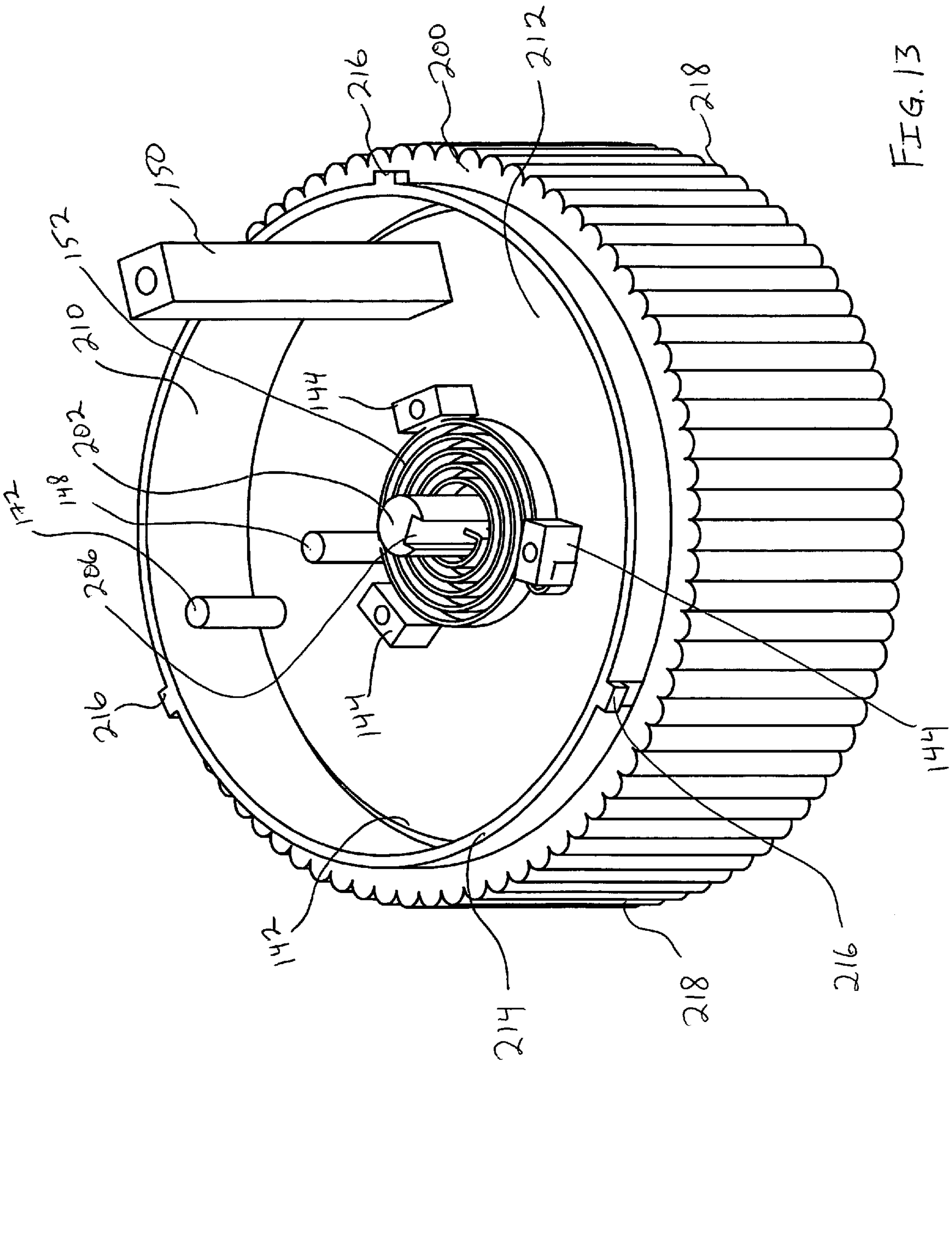
FIG. 13 shows a top perspective view of a top perspective view of a spring base assembly without a spring cover and a valve handle cover.
Figure 14:
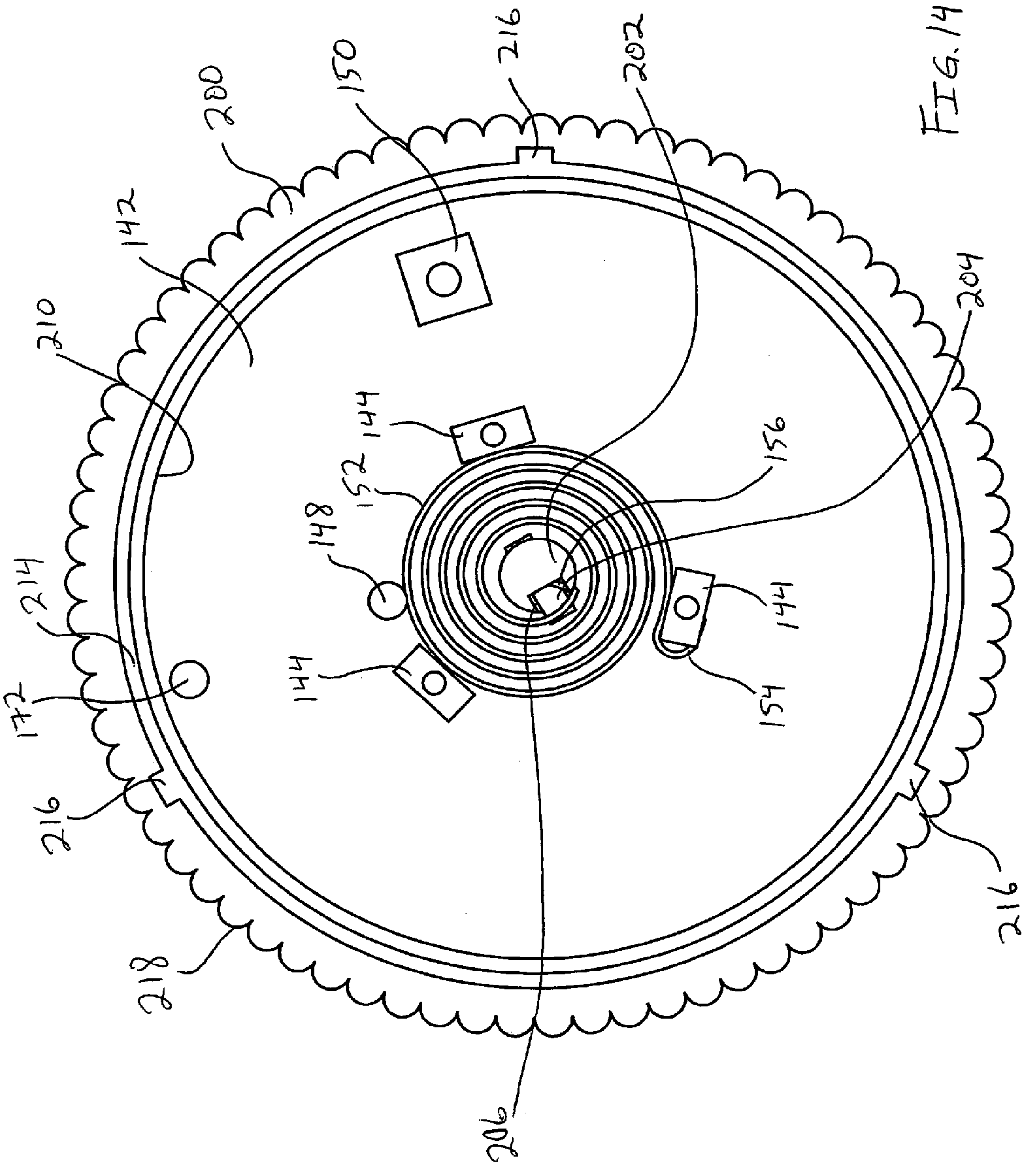
FIG. 14 shows a top view of a top perspective view of a spring base assembly without a spring cover and a valve handle cover.
Figure 15:
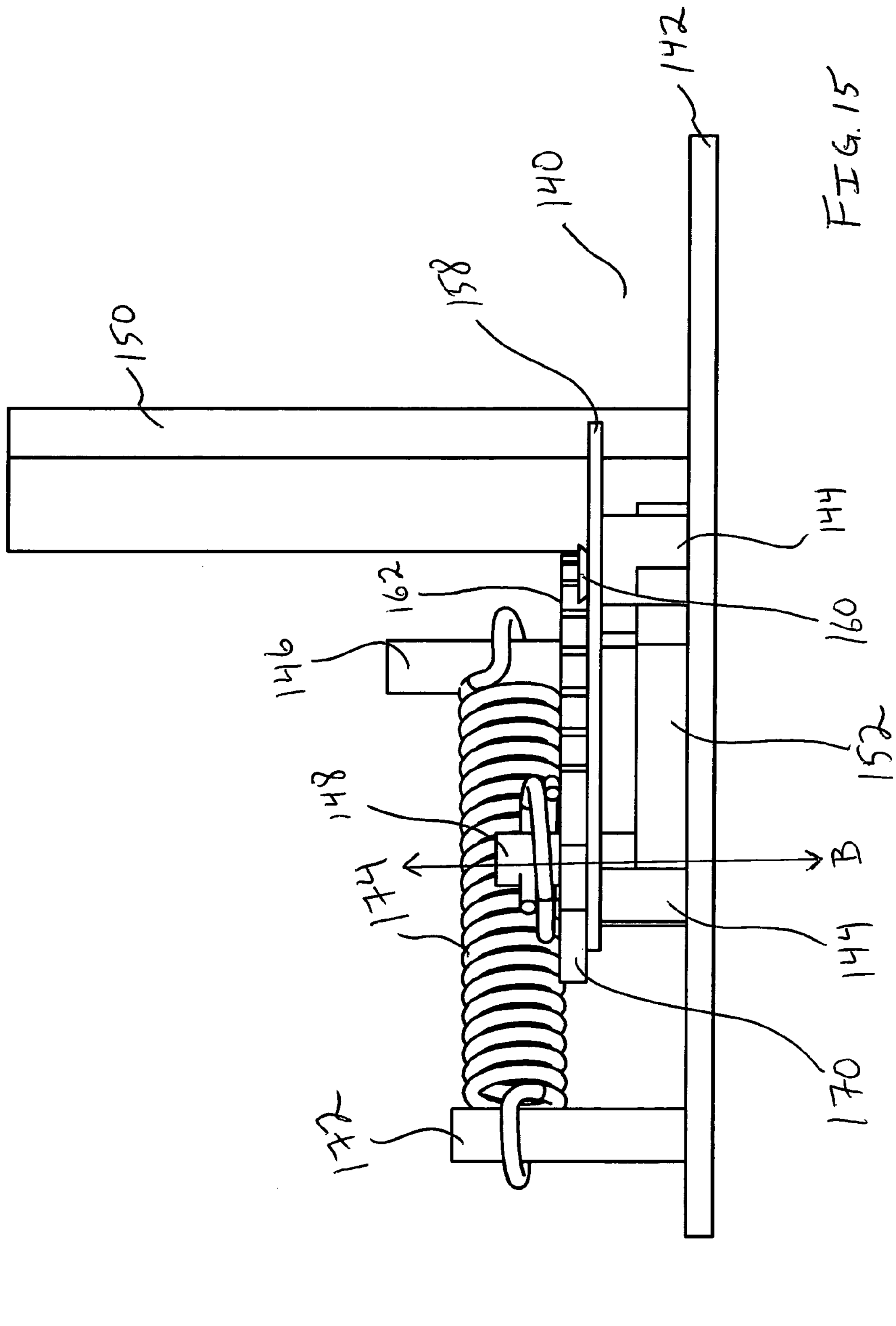
FIG. 15 shows a plan view of a spring base assembly.
Figure 16:
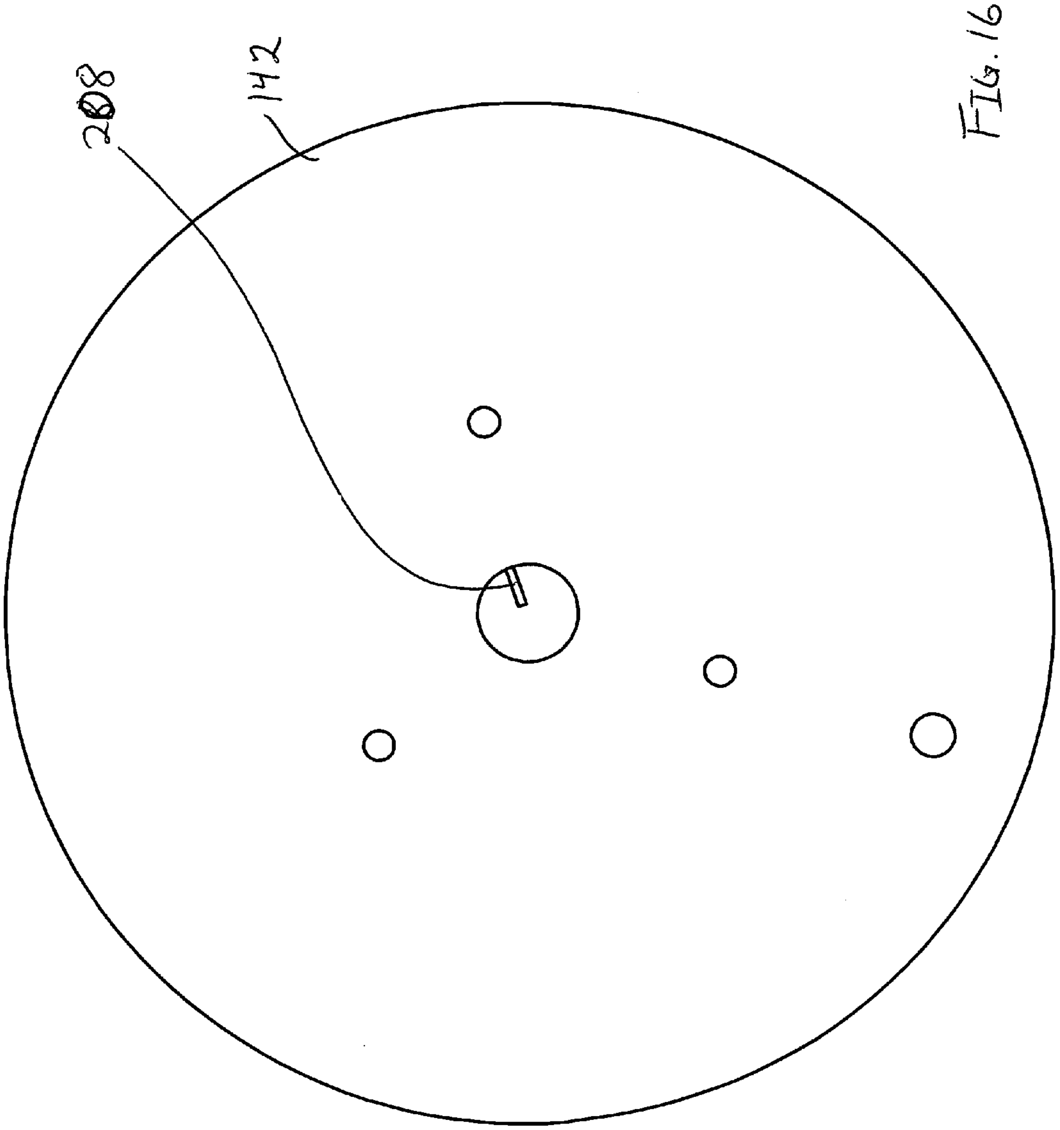
FIG. 16 shows a bottom view of a spring base assembly.

Referring now to specifically FIGS. 6 through 8 and generally throughout the other figures, securing top 80 comprises first annular shoulder 90 and second annular shoulder 92 provided along the bottom surface of securing top 80. First annular recess 94 is defined by the interior surface of first annular shoulder 90 and the exterior surface of second annular shoulder 92. The interior surface of second annular shoulder 92 generally along with the bottom surface of securing top 80 defines timer housing space 96. Timer device 98 is positioned within timer housing space 96 and may be secured with screws 99 or other affixation devices to securing top 80. Timer device 98 comprises drive shaft 100 that rotates about center Axis A as shown between FIGS. 17 and 18. Drive shaft 100 is attached to timer driving arm 124 of timer adjustable handle 120 as described in further detail herein.

A non-limiting example of timer device 98 in an embodiment of the invention may comprise a timer mechanism described in U.S. Pat. No. 7,252,113, which is capable of being set by rotational force placed on it. Alternative forms of timer mechanisms may be implemented so long as the timer mechanisms may be mechanically wound and exert sufficient force to rotate timer adjustable handle 120 with its timer driving arm 124 actuate pawl 170 away from its biased position against ratchet 162 as discussed further herein.

Referring now specifically to FIGS. 6 through 8, securing top 80 comprises clock spring base stabilizer post receptor 102 along its bottom surface. Spring base stabilizer post receptor 102 is configured to receive spring base stabilizer post 150 such that screw 99 may secure spring base stabilizer post 150 to securing top 80 with timer driving arm 124 of timer adjustable handle 120 attached to drive shaft 100 of timer device 98 in mechanical shutoff device 10.

Figure 2:
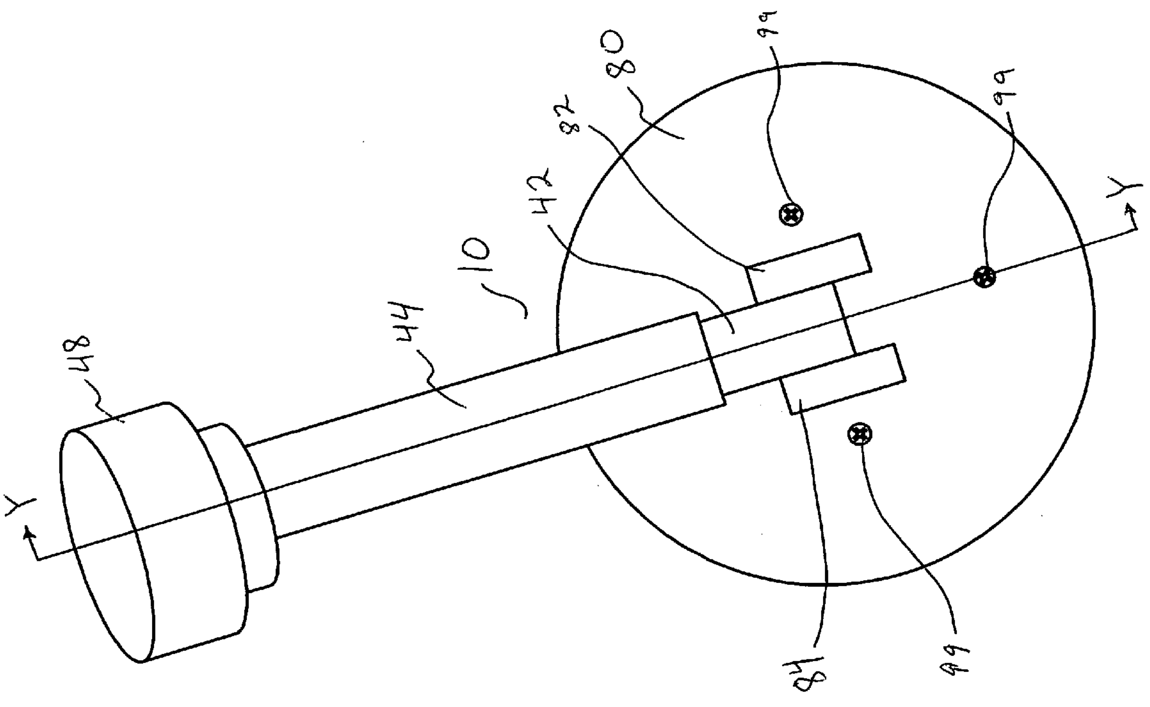
FIG. 2 shows a top view of an externally-mounted mechanical valve shutoff device.
Figure 3:
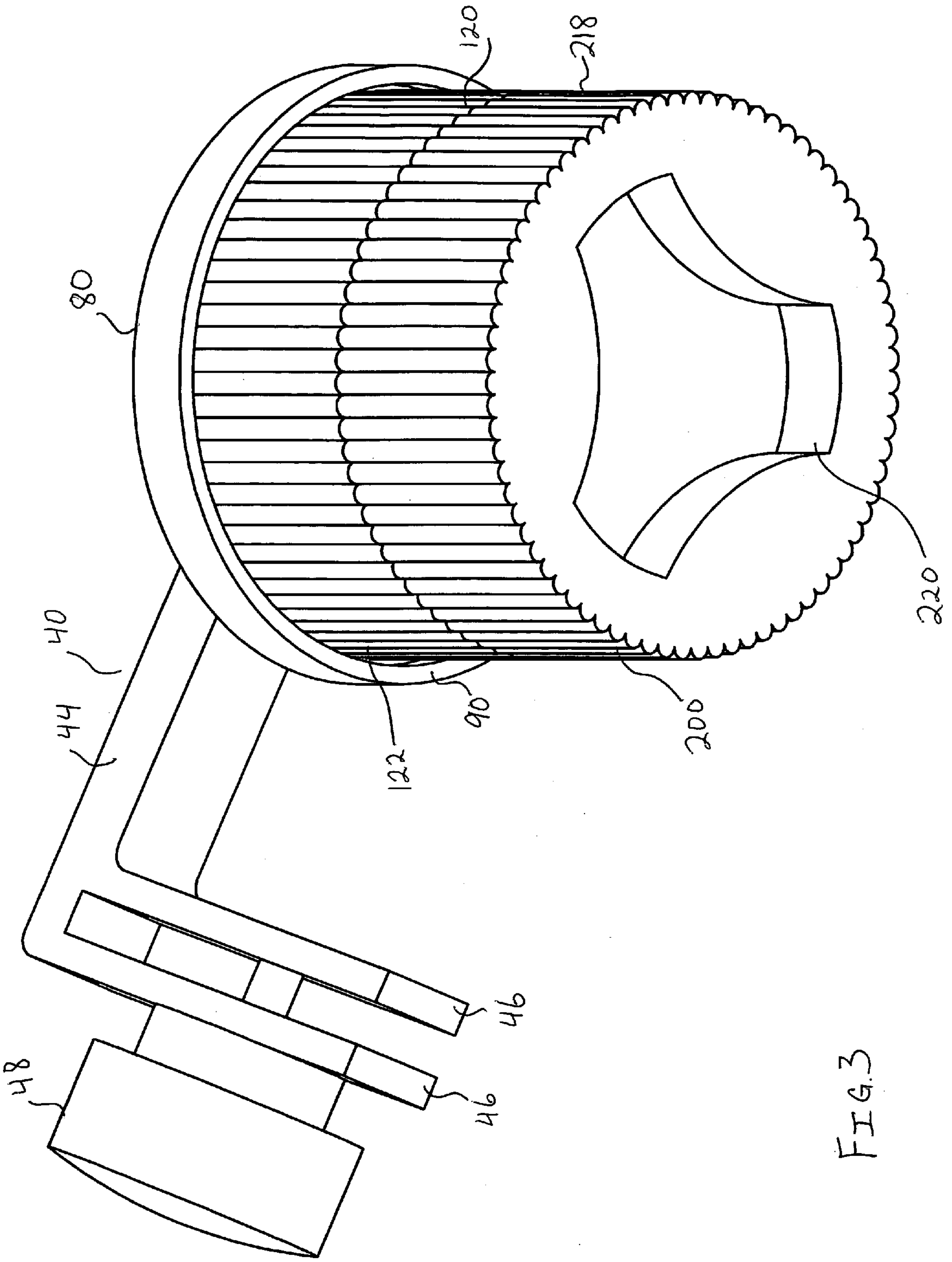
FIG. 3 shows a bottom perspective view of an externally-mounted mechanical valve shutoff device.
Figure 4:
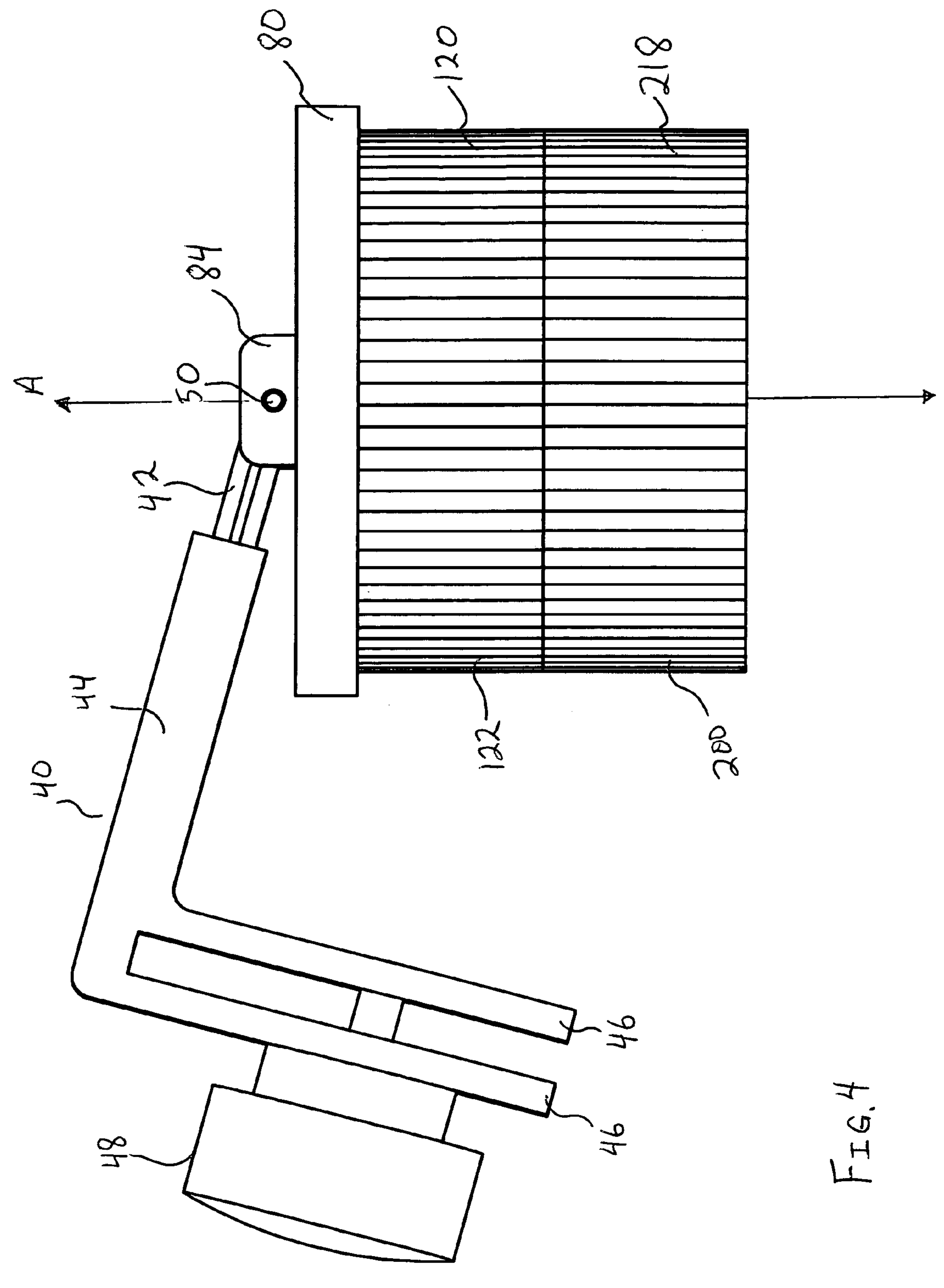
FIG. 4 shows a plan view of an externally-mounted mechanical valve shutoff
Figure 5:
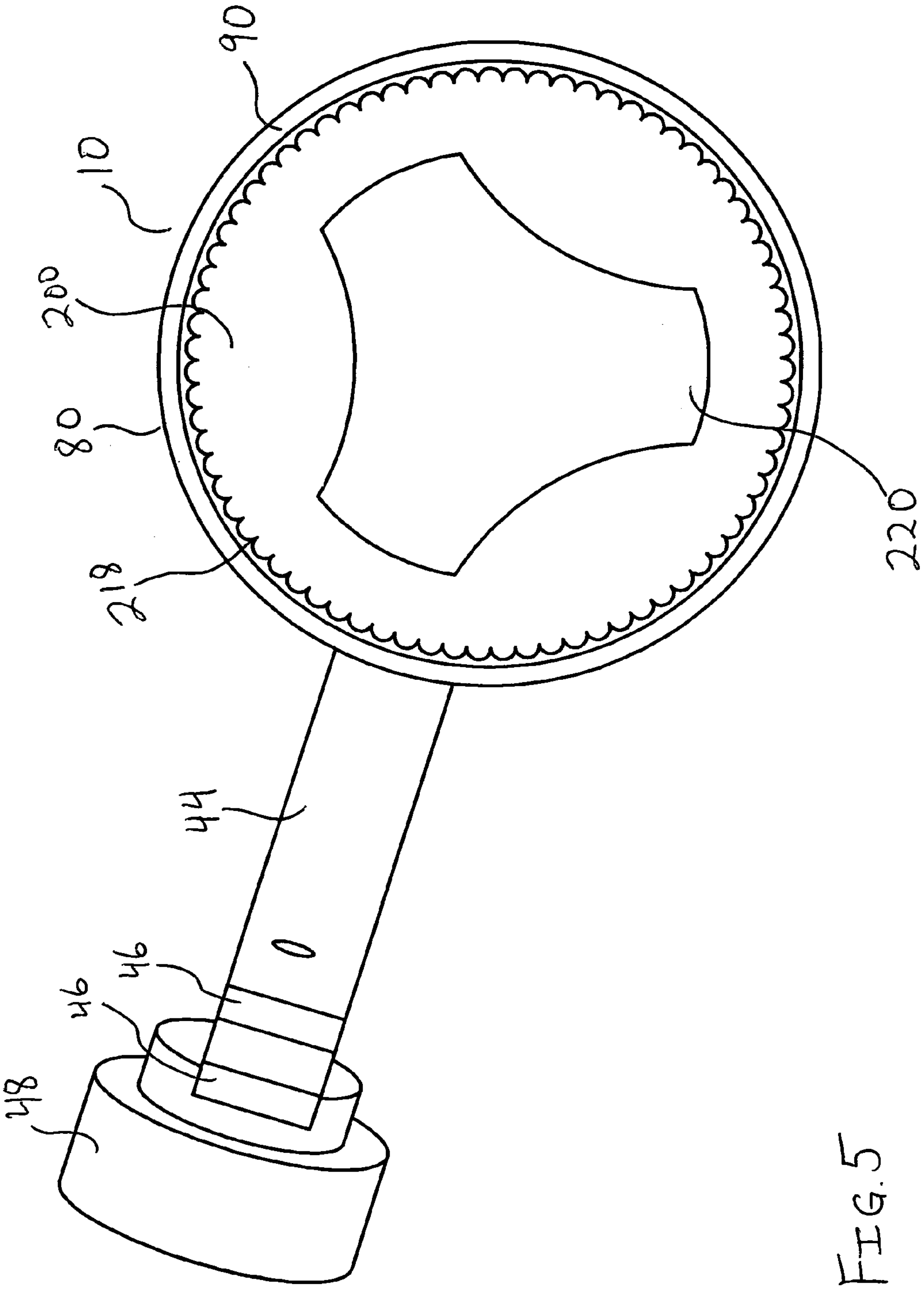
FIG. 5 shows a bottom view of an externally-mounted mechanical valve shutoff

Referring now generally to FIGS. 1 through 3 and more specifically to FIGS. 9 and 17 through 21, timer adjustable handle 120 is provided rotatably secured to securing top 80. Top of timer adjustable handle 120 is rotatably positioned within first annular recess 94 of securing top 80 such that timer adjustable handle 120 is permitted to rotate about center Axis A of mechanical shutoff device 10. Timer adjustable handle 120 comprises timer driving arm 124 that is configured to attached to and be rotated by drive shaft 100 of timer device 98. Friction surface 122 is provided along the outer side surface of timer adjustable handle 120. As shown specifically in FIG. 9 and FIGS. 19 through 21, annular slot 130 is provided along with notches 128 internally and near the bottom of timer adjustable handle 120. Timer adjustable handle 120 is provided to wind timer device 98 as timer driving arm 124 is rotated with timer adjustable handle 120. As timer device 98 unwinds, timer device 98 drive shaft 100 rotates timer driving arm 124 and rotates timer adjustable handle 120 as shown in sequence from FIG. 17 to FIG. 18.

Timer adjustable handle 120 may be comprised of plastic, polymers, metal, metal alloys, fiberglass, graphic, or any suitable material capable mechanically winding up timer device 98 and also driving timer adjustable handle 120 as timer device 98 unwinds and actuates pawl 170.

Referring now generally to FIGS. 10 through 21, and more specifically to FIGS. 10 through 16, spring base assembly 140 is provided with mechanical shutoff device 10. As shown specifically in the exploded view of FIG. 12, spring base assembly 140 comprises spring base 142, containment posts 144, pawl pivot post 148, stabilizer post 150, clock spring 152, spring cover 158, and pawl 170 configured to engage ratchet 162 attached to center post 202 of valve handle cover 200. Spring base assembly 140 is attached to securing top 80 such that spring base assembly 140 does not rotate about center Axis A.

Referring now generally to FIGS. 10 through 21, and more specifically to FIGS. 10 through 16, clock spring 152 is provided and comprises first spring end 154 and second spring end 156. Clock spring 152 is housed between spring base 142 attached with screws 160 to spring cover 158 and also between spring containment posts 144. First spring end 154 is secured to one spring containment post 144, whilst second spring end 156 is configured to be housed within spring slot 208 provided vertically parallel along center Axis A of center post 202.

Clock spring 152 may be any configuration that generates enough torsional force when released from a partially or fully wound position to close a valve handle of a pressurized tank or cylinder. As a non-limiting example, clock spring 152 may be provided as part 166 in U.S. Pat. No. 7,252,133. Other non-limiting examples of clock springs comprise Lesjofors Cat. No: SF-SF 0904 capable of producing torque (N-mm, lb-in.): 374,3.31 and Cat. No: SF-DF 3366 with Spring Constant (N/mm, lb/in): 3.75,21.41.

Referring now generally to FIGS. 10 through 21, and more specifically to FIGS. 10 through 16, pawl 170 is provided with spring base assembly 140 and pivotally secured to spring base assembly 140 with pawl pivot post 148 and is secured to pawl pivot post 148 with pin 204. Pawl 170 is biased to a default position in which pawl 170 engages any one gear tooth of ratchet 162. Pawl 170 is biased in this default position by way of spring 174 attached at one end to spring post 172 and at its other end to actuating post 146. Spring 174 allows pawl 170 to engage and ratchet with ratchet 162 and to function with ratchet to secure and store potential energy within a partially to fully wound clock spring 152 while first spring end 154 of clock spring 152 is held statically by a containment post 144 and second spring end 156 rotates about center Axis A during winding or unwinding of clock spring 152 using valve handle cover as described in further detail herein.

Referring now generally to FIGS. 10 through 21, and more specifically to FIGS. 10 through 16, pawl 170 is biased in a default position therein engaging any one gear tooth 164 of ratchet 162. Pawl 170 may be actuated by timer driver arm 124 of timer adjustable handle 120. As timer device 98 winds down it rotates timer adjustable handle 120 and timer driving arm 124 with drive shaft 100. Timer driving arm 124 is configured to provide sufficient rotational force to pivot pawl 170 about pawl Axis B, against its biased default position, as timer driving arm 124 contacts actuating post of pawl 170 thereby releasing pawl 170 from ratchet 162. This in turn allows for any potential energy stored in clock spring 152 to be released into kinetic energy in the form of torsional force that forcibly rotates valve handle cover 200 about center Axis A and to rotate any valve handle positioned within tank handle recess 220 of valve handle cover 200 as described in further detail herein.

Referring generally to FIGS. 1, 3 through 5, 10 through 14, and 17 through 21, valve handle cover 200 is provided with mechanical shutoff device 10. Valve handle cover 200 comprises annular wall 210 having friction surface 218 provide along its exterior surface and a bottom having tank handle recess 220. Tank handle recess 220 may be configured to receive any shape of handle for a pressurized tank or cylinder. The interior of annular wall 210 and the bottom of valve handle cover 200 defines cavity 212. Center post 202 is provided with valve handle cover 200 and projects vertically along center Axis A such that center post 202 rotates about Axis A. Center post 202 comprises key slot 206 to secure ratchet 162 to center post 202 with key 168 and pin 204. As previously mentioned, center post 202 also provides clock spring slot 208 to receive second spring end 156 of clock spring 152. Raised annular portion 214 is provided along the top surface of valve handle cover 200 along with several projections 216. Raised annular portion 214 is configured to fit, and rotate, within annular slot 130 of timer adjustable handle 120. During assembly, projections 216 of valve handle cover 200 are aligned to fit within notches 128 and then rotatably slide within annular slot 130 of timer adjustable handle 120.

Spring base assembly 140 and valve handle cover 200 may also be comprised of plastic, polymers, metal, metal alloys, fiberglass, graphic, or any suitable material, or any combination thereof.

A method of using mechanical shutoff device 10 for a preset, timed mechanical closure of a pressurized tank or cylinder is provided by the present invention.

Mechanical shutoff device 10 is placed on top of pressurized cylinder or tank by way of positioning the handle of the valve of the cylinder or tank within tank handle recess 220. The handle of the cylinder or tank valve should be in a closed position such that the valve is closed. Likewise, telescoping securing arm 40 of mechanical shutoff device 10 may be pivoted about pin 50, which is pivotally positioned within pin receiving communication 52 of second portion of arm 40 and first communication 86 and second communication 88 of first portion of pin receiving mount 82 and second portion of pin receiving mount 84, respectively, of securing top 80. Telescoping securing arm 40 is pivoted in a manner, and also extended or shorted in length by the telescoping feature provided by first portion 42 and second portion 44 so that fork-like securement supports 46 may be positioned to receive collar of tank or cylinder between fork-like securement supports 46. Engagement 48, such as thumb screw, may be tightened to secure telescoping securing arm 40 to collar of tank or cylinder. In this configuration, mechanical shutoff device 10 is secured to the pressurized tank or cylinder.

Next, and with mechanical shutoff device 10 secured to the cylinder or tank and receiving the cylinder or tank valve handle in tank handle recess 220, clock spring 152 of mechanical shutoff device 10 should be in a first position, which comprises a substantially unwound configuration about center Axis A within containment posts 144 and between spring base 142 and spring cover 158 of spring base assembly 140. In order to partially or substantially wind valve handle cover 200 about center Axis A to store torsional force in clock spring 152, timer adjustable handle 120 must first be rotated counterclockwise about center Axis A to, at least, release any contact between timer driving arm 124 and actuating post 146 so that pawl 170 returns to its default position engaging ratchet 162. Clock spring 152 may then be wound from a substantially unwound or, even, a partially wound configuration by rotating valve handle cover 200 about center Axis A in a counterclockwise motion relative to spring base assembly 140, timer adjustable handle 120, and securing top 80, which are not rotated about center Axis A. In rotating valve handle cover 200, torsional force is being stored by clock spring 152 as pawl 170, in its default position, and as biased by spring 174, engages gear teeth of ratchet 162 secured to rotating center post 202 of valve handle cover 200 and preventing the release of torsional force stored by clock spring 152.

Valve handle cover 200 may be rotated until valve of pressurized tank or cylinder is opened sufficient for use. Herein, a torsional force sufficient to rotate the valve handle of a tank or cylinder to a closed position is stored by clock spring 152. With the torsional force stored as potential energy by a substantially wound clock spring 152, the handle of valve of tank or cylinder, with the valve opened, is positioned substantially within tank handle recess 220 of valve handle cover 200 such that mechanical shutoff device 10, with substantially wound clock spring, is resting on the valve handle of the tank or cylinder.

If necessary, and to the extent timer device 98 has not already been wound to a desired countdown time, timer device 98 may be wound to a desired time setting. This countdown time may be any allotted time that the pressurized tank or cylinder must provide a gas through a supply line to a grill, for example, with any additional time. Timer device 98 may be wound by rotating timer adjustable handle 120 counterclockwise about center Axis A from an partially unwound position, or more than 0 minute countdown, to a partially or fully wound position, or desired countdown time, such as, for example, more or less than about 15 up to about 60 minutes or more which depends on the maximum countdown time provided by timer device 98.

Figure 17:
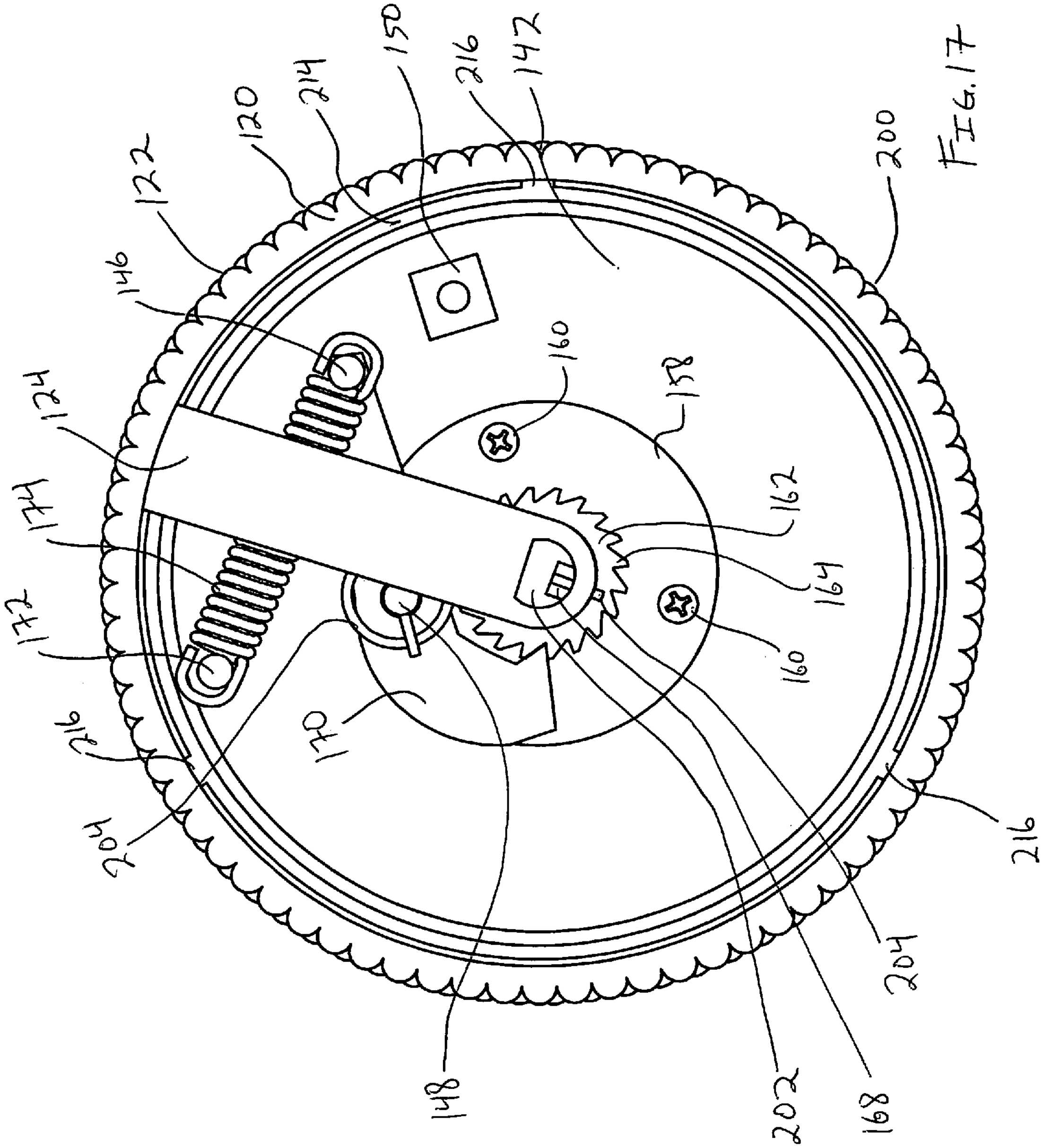
FIG. 17 shows a top view of a timer adjustable handle, a spring base assembly and a valve handle cover of an externally-mounted mechanical valve shutoff device.
Figure 18:
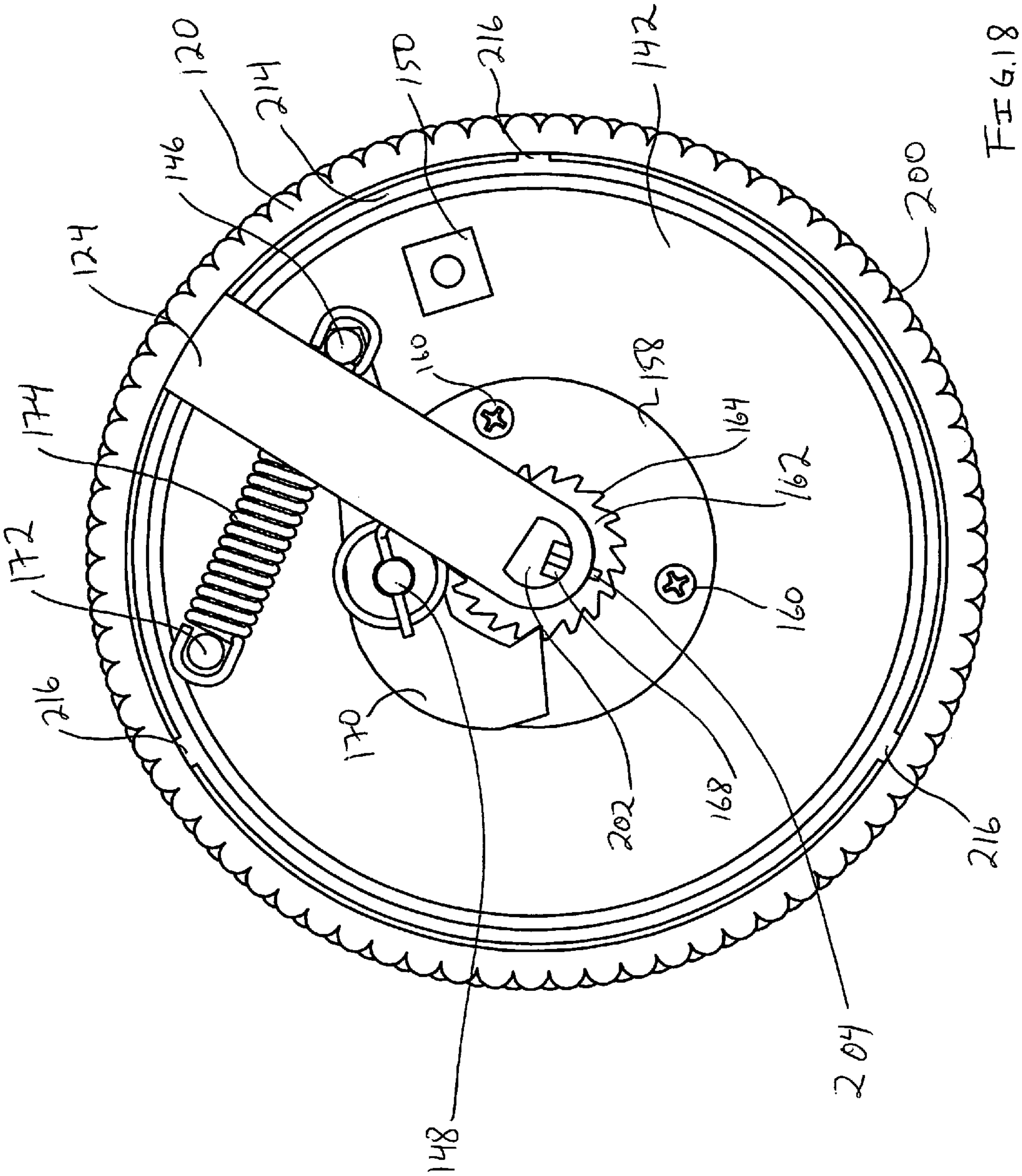
FIG. 18 shows another top view of a timer driver arm of a timer adjustable handle contacting a spring post of a pawl of the spring base assembly housed in the valve handle cover of an externally-mounted mechanical valve shutoff device.

With timer device 98 set to a desired countdown time, timer device 98 will count down, as shown specifically in sequence from FIG. 17 to FIG. 18 with drive shaft 100 of timer device 98 rotating timer driving arm 124 and timer adjustable handle 120 in a clockwise rotation about center Axis A. As timer device 98 unwinds and counts down to 0 time, timer driving arm 124, as shown specifically in FIG. 18, contacts actuating post 146 of pawl 170 which, then in turn, continues to push against actuating post 146 and then pivots pawl 170 about pawl Axis B, from its default position to an position that releases the contact between pawl 170 and ratchet 162.

Once pawl 170 no longer engages ratchet 162, the potential energy in the nature of torsional force held by clock spring 152 is released. With the release of the torsional force, clock spring 152, which is attached by way of spring slot 208 to center post 202 of valve handle cover 200, forcibly rotates valve handle cover 200, and consequently, valve handle positioned within tank handle recess 220, clockwise about center Axis A. As valve handle cover 200, and its center post 202 and ratchet 162 rotate about center Axis A, telescoping securing arm 40, which is attached to the collar of the pressurized tank or cylinder, maintains itself in a fixed or static position along with securing top 80, along with timer device 98, timer adjustable handle (with any residual movement of timer adjustable handle 120 relative solely to timer device 98 attached to securing top 80), and spring base assembly 140 with the exception any movement of second spring end 156 and unwinding clock spring 152 relative to first spring end 154 attached to a containment post 144 of spring base assembly 140.

Clock spring 152 releases torsional force and rotates valve handle cover 200 clockwise about center Axis A and, consequently, rotates handle of valve of pressurized tank or cylinder, which is positioned within tank handle recess 220, in a clockwise motion, thereby closing the valve of the pressurized tank or cylinder, all while other structural aspects of mechanical shutoff device 10, including, timer securing arm 40, securing top 80, timer adjustable handle 120 (relative to timer device 98), and spring base assembly 140, are maintained in a static position.

Mechanical shutoff device 10 with substantially unwound clock spring 152 may be removed or remain positioned on the valve handle of the pressurized tank or cylinder.

In an alternative embodiment, clock spring 152 and timer device 98 may be set before mechanical shutoff device 10 is attached to the collar of a pressurized tank or cylinder so long as clock spring 152 is set with enough potential torsional force to close an open valve handle, and valve handle cover 200 may be rotated about center Axis A in a clock wise rotation with sufficient degrees of rotation to close valve handle within tank handle recess 220 of valve handle cover 200.

Mechanical shutoff device 10 may also be configured in such a way that any rotation may occur in an inverse manner as disclosed herein. By way of example, mechanical shutoff device 10 may be configured for counterclockwise closure of a valve handle. For example, in instances of clockwise rotation of any of its aspects, mechanical shutoff device 10 could be configured for counterclockwise rotation. Likewise, in instances of counterclockwise rotation of any other of its aspects, mechanical shutoff device 10 could be configured for clockwise rotation.

While preferred embodiments of the present invention have been shown and described, it will be apparent to those skilled in the art that many changes and modifications may be made without departing from the invention in its broader aspects. The appended claims are intended to cover, therefore, all such changes and modifications as fall within the true spirit and scope of the invention.

We claim:

1. A mechanical valve shutoff device comprising:
- a non-rotational housing, wherein the housing is configured to engage a cylinder or tank;
- a rotational housing configured to receive a handle of the cylinder or tank; and
- a torsional spring attached to the non-rotational housing and the rotational housing; wherein the torsional spring is capable of storing rotational force and releasing rotational force.

2. The mechanical valve shutoff device of claim 1, wherein the non-rotational housing comprises a securing top with a timer device, a rotatable timer adjustable handle having a driving arm secured to a driving shaft of the timer device, and a spring base assembly attached to the securing top.

3. The mechanical valve shutoff device of claim 2, wherein the securing top comprises a pivotal and telescoping securing arm.

4. The mechanical valve shutoff device of claim 3, wherein the timer device is capable of rotating the rotatable timer adjustable handle about a center axis of the device from a substantially wound configuration to a substantially unwound configuration of the timer device.

5. The mechanical valve shutoff device of claim 4, wherein the spring base assembly comprises a housing to secure a first end of the torsional spring to the spring base assembly and second end of the torsional spring to a slot of a center post of the rotational housing.

6. The mechanical valve shutoff device of claim 5, wherein the spring base assembly comprises a pawl and ratchet wherein the pawl is pivotally secured by a first post to the spring base assembly, wherein the pawl comprises a second post configured to pivot the pawl about the first post, and wherein a second post is attached with an extensible spring to a fixed element.

7. The mechanical valve shutoff device of claim 6, wherein the pawl and ratchet is configured to releaseably maintain torsional force of the torsional spring in a wound position, and wherein the second post of the pawl is configured to release the torsional force of the torsional spring when the driving arm of the rotatable timer adjustable handle is in the substantially unwound configuration.

8. The mechanical valve shutoff device of claim 7, wherein the rotational housing is configured to be rotatably driven by release of torsional force of torsional spring when the driving arm of the rotatable timer adjustable handle is in the substantially unwound configuration.

9. The mechanical valve shutoff device of claim 8, wherein the rotational housing comprises projections along a raised annular surface configured to be received in an annular slot of the rotatable timer adjustable handle.

10. A mechanical device, comprising
- a securing mechanism;
- a rotatable mechanism having a handle recess; and
- a torsional spring, wherein the torsional spring is configured for timed storage and release of torsional force; and wherein the securing mechanism comprises a securing device for securing the mechanical device to a tank or cylinder.

11. The mechanical device of claim 10, wherein the securing mechanism comprises a securing arm and a top housing a timer, wherein the top is secured to a spring assembly housing the torsional spring.

12. The mechanical device of claim 11, wherein the device further comprises a timer handle having a driver arm configured to wind the timer and wherein the timer is configured to rotate the driver arm from a substantially wound configuration to a substantially unwound configuration.

13. The mechanical device of claim 12, wherein the driver arm is configured to pivot a pawl rotatably attached to the spring assembly and actuated with an extensible spring.

14. The mechanical device of claim 13, wherein a further ratchet is attached to a center post of the rotatable mechanism, wherein the pawl is configured to releaseably secure the ratchet.

15. The mechanical device of claim 14, wherein the pawl and ratchet are configured to store torsional force of a wound torsion spring.

16. The mechanical device of claim 14, wherein the ratchet, the center post, and the rotatable mechanism are configured to rotate about a center axis of the device.

* * * * *